United States Patent
Dawson

[15] 3,667,148
[45] June 6, 1972

[54] FISHING LINE SUBMERGING DEVICE

[72] Inventor: Donald J. Dawson, Route 4, P.O. Box 124-A, Salem, Oreg. 97302

[22] Filed: Sept. 17, 1969

[21] Appl. No.: 858,788

[52] U.S. Cl. .................................................. 43/43.13
[51] Int. Cl. ........................................................ A01k 85/00
[58] Field of Search ........................... 43/43.13, 42.39, 42.5

[56] References Cited

UNITED STATES PATENTS

| D217,644 | 5/1970 | Smith | 43/43.13 X |
| 2,220,302 | 11/1940 | Thorne | 43/43.13 |
| 2,235,868 | 3/1941 | Coolidge et al. | 43/43.13 |
| 2,585,494 | 2/1952 | Pelto | 43/42.49 X |
| 3,466,787 | 9/1969 | Collins | 43/43.13 |

*Primary Examiner*—Warner H. Camp
*Attorney*—Kimmel, Crowell & Weaver

[57] ABSTRACT

A device for connection to a fishing troll line to force the tail line and its connected flashers and natural bait or artificial lures to a desired depth in water being fished, and including means automatically operated by a fish when striking the bait or lure for setting the fish hook.

4 Claims, 4 Drawing Figures

PATENTED JUN 6 1972 3,667,148

INVENTOR.
D. J. DAWSON

BY Kimmel, Crowell & Weaver
ATTORNEYS

3,667,148

FISHING LINE SUBMERGING DEVICE

BACKGROUND OF THE INVENTION

1. Field of the Invention

This invention relates to troll fishing apparatus and, more specifically, to a diving plane having an offset weight for causing the fishing bait or lure to descend to a desired depth in the water, and to provide means slidably mounted on the plane and connected to the fishing line to effect the change of the position of the plane to cause the fish hook to set after having been struck by a fish.

2. Description of the Prior Art

Trolling planes are not, per se, new in the art of fishing. Trolling planes of prior art devices have also been provided with trip means for setting a fish hook after the hook has been struck by a fish, but such planes and trip mechanisms appear to have inherent disadvantages which this invention proposes to eliminate. With respect to the instant invention, the U.S. Pat. No. 2,235,868, which issued to Lloyd E. Coolidge et al., is, perhaps, representative of the state of the art. As the plane of these patentees has been illustrated, it is apparent that if the trolling plane were connected to spinners, flashers, and natural bait or artificial lures having any appreciable drag, the plane would readily trip. This would make it necessary for the troller to reset the plane very frequently. The patentees' trolling line is connected to the plane forward of its center which again would tend to make the plane subject to frequent tripping action.

Another type of trolling plane, together with trip means, is shown in the United States patent to William T. Thorne, U.S. Pat. No. 2,220,302. This trolling plane, as in the Coolidge et al. device, will readily trip when relatively heavy spinners or flashers are connected to the lure carrying line. A careful study of this patent seems to show that the device is not constructed in such a manner as to approach the water at an angle of between 30° and 45°, which is essential, and consequently does not dive but only drags the water.

SUMMARY OF THE INVENTION

The present invention is designed to provide a deep diving plane for connection to a trolling line and a tail line to which a baited hook or artificial lure may be also connected. The plane has been found to operate quite satisfactorily in trolling for relatively large fish such as, for example, salmon. Recognizing the inherent disadvantages of the prior art planes, as set forth above, this invention has been developed to prevent the inadvertent and accidental tripping of the plane except under those conditions wherein a salmon or other fish actually strikes a baited hook or artificial lure. When the fish strikes, the diving plane is tripped in such a manner that the connected end of the trolling line moves relative to the plane until it strikes abutment means which causes the plane to introduce a sharp jerk on the tail line causing the hook carried thereby to firmly set in the fish.

With a submersible diving plane constructed in accordance with this invention, the inadvertent and accidental tripping thereof is eliminated, and it is unnecessary for the user to employ heavy lead sinkers or other conventional means to take the bait or lure to the desired depth to which it should be maintained in order to effectively and efficiently conduct a fishing operation.

The present invention also contemplates a submersible trolling plane which, if accidentally and/or inadvertently tripped, is so constructed as to enable the fisherman to reset the device without having to reel the device into the boat.

It should be further noted that the plane according to this invention is non-complex in construction and assembly, is inexpensive to manufacture and maintain, and which is rugged and durable in use.

Other objects and advantages of the instant invention will become more manifest from a consideration of the following specification when read in light of the annexed drawing.

DESCRIPTION OF THE PREFERRED EMBODIMENT

Figure 3:
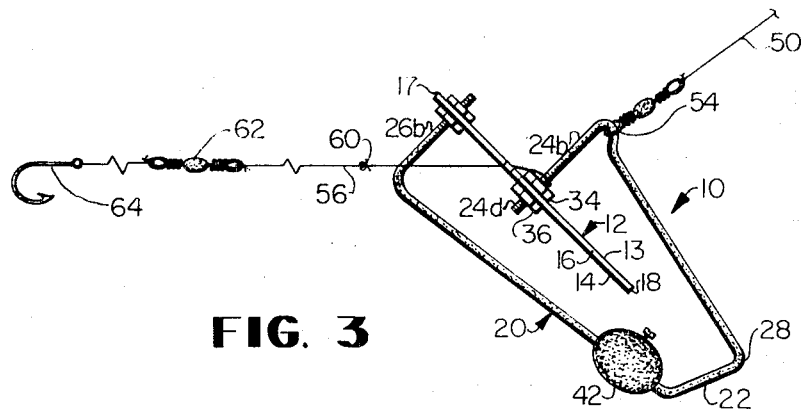
FIG. 3 is an enlarged side elevational view of the plane illustrating the normal position of the plane and its component elements as a trolling hook is moved through a body of water.
Figure 4:
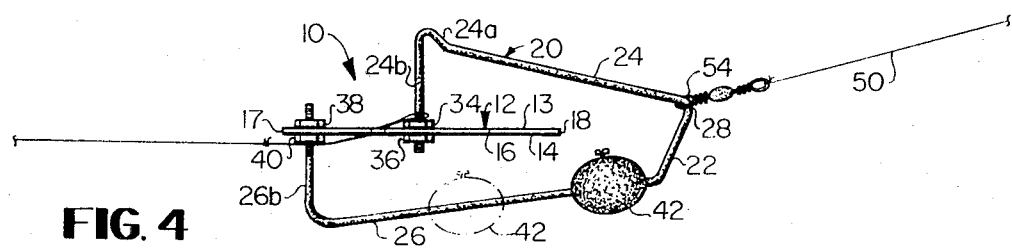
FIG. 4 illustrates the plane and the relative positions of its component elements after the plane has been tripped and the fish hook is set.
Figure 2:
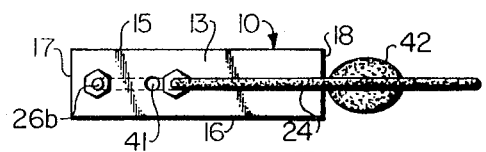
FIG. 2 is a top plan view of the plane as shown in FIG. 1, FIG. 2 being drawn to a reduced scale.
Figure 1:
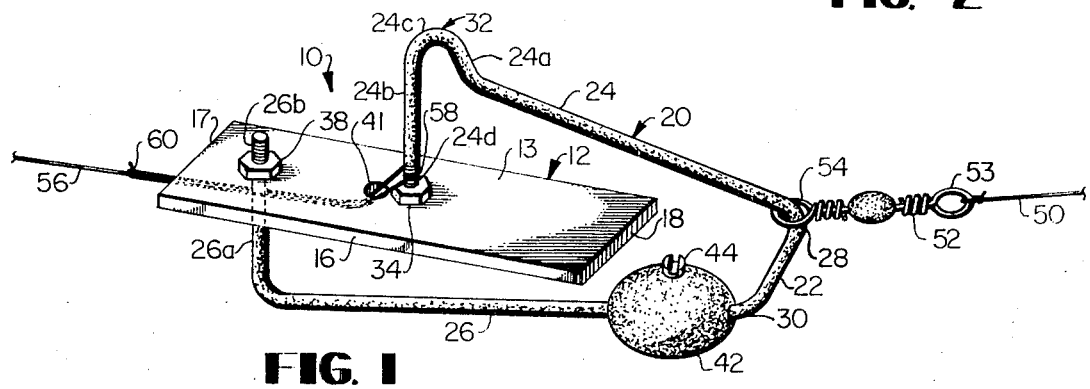
FIG. 1 is a perspective view of a submersible trolling plane constructed according to this invention.

Referring now more specifically to the drawing, reference numeral 10 designates, in general, a fishing line submersible diving plane or device constructed in accordance with the teachings of this invention. The device 10 is seen to include an elongated substantially rectangular trolling or guide plane 12 having opposed flat parallel and rectangular top and bottom sides 13, 14, respectively, an opposed pair of flat parallel and rectangular side edges 15, 16, and an opposed pair of flat parallel and rectangular trailing and leading ends 17, 18, respectively. The plane 12 may be formed of a non-corrosive plastic material in various colors and sizes.

An open substantially U-shaped frame formed of an elongated length of a brass rod or other desirable non-corrosive materials is designated by reference numeral 20. The frame 20 comprises a bight portion 22 from the opposed ends of which laterally project, respectively, a pair of diverging but confronting arms 24, 26. The angle formed at the inner section of the bight portion 22 with the arm 24 is acute to provide an abutment loop or shoulder 28 to serve a function to be related below. The angle between the bight portion 22 and the arm 26 is obtuse forming a second abutment loop or shoulder at 30 and serves another function to be described infra.

As is seen in the drawing, the arm 24 includes a straight portion that extends rearwardly of the bight 22 above the plane top side 13. An extension 24a of the straight portion extends rearwardly of the straight portion and upwardly a substantial distance from the axis of the straight portion and then arcuately downwardly along a bight 24c to join a downward extension 24b that extends toward the plane 12. The bight 24c forms a U-shaped notch 32. The other arm 26 is of a longer axial length than the arm 24 and the outer end thereof is laterally bent in the direction of the arm 24 to form an extension 26a. The arm extensions 24b and 26a are threaded at 24d and 26b adjacent their respective free ends. It should here be noted that the arm extensions 24b, 26a are laterally spaced and are substantially parallel with respect to one another.

The threaded free end 24d of the arm extension 24b passes transversely through a suitable opening (not shown) at substantially the center of the plane 12 and is clamped thereon by lock nuts 34, 36 which frictionally engage against the top and bottom sides 13, 14, respectively. In a like manner, the threaded free end 26b of the arm extension 26a extends transversely through an opening (not shown) also formed in the plane 12 and is clamped thereon by lock nuts 38, 40 which, as before, frictionally engage the opposed top and bottom sides 13, 14, respectively. As is seen in the several figures of the drawing, the arm extension 26a is centered between the edges 15, 16, and is spaced inwardly from the trailing end 17. The plane 12 is also provided with a transversely extending opening 41 centered between the edges 15, 16 adjacent the arm extension 24b and is remotely positioned relative to the arm extension 26a, to serve a function to be described.

The device 10 also includes an ellipsoidal weight 42 which is slidably mounted on the arm 26 and is fixedly secured in an adjusted position by a set screw 44.

In the construction described above, it is to be understood that the arms 24, 26 and their several extensions, as well as the bight portion 22, all have their longitudinal axes contained in a plane which includes the longitudinal axis of the plane 12 and which is perpendicular with respect thereto. It will be further understood, that the arm 24 is disposed in vertically spaced relationship relative to the upper side 13 of the plane 12, and that the arm 26 is also disposed in vertically spaced relationship relative to the bottom side 14 of the plane 12. As is seen in the drawings, the bight portion 22 is spaced forwardly of the leading end 18 to form skid means to which further reference will be made below.

The device 10 is adapted to be used in deep water trolling for fish which may weigh up to 60 pounds or more. To this end, the device 10 is connected to the free end of a conventional trolling line 50 by means of the usual swivel connector means 52. As is seen in the drawing, the ring 53 of the swivel connector 52 is tied to the line 50 while the other ring 54 of the swivel connector 52 is slidably received over the arm 24 whereby the same may be engaged in the notch 32 when the plane 12 is in its operative position, or to engage against the abutment shoulder 28 after the device 10 has been tripped.

Reference numeral 56 denotes one end of a tail line which extends below the trailing edge 17 for engagement against the bottom side 14 of the plane 12, this end of the tail line passing to one side of the arm extension 26a and being threaded through the opening 41. This end of the tail line is then looped about the arm extension 24b adjacent the threaded end 24d and is again threaded through the opening 41 to pass on the opposite side of the arm extension 26a and beyond the trailing end 17 to a point where it is knotted with a non-slip knot as at 60 to the tail line 56. The other end of the tail line 56 connects with the conventional flashers, spinners, lures or a fish hook such as is indicated at 64 which normally would be baited with an appropriate bait.

In operation, the device 10 together with the tail line 56 and connected tackle may be dropped overboard regardless of the position of the ring 54 relative to the arm 24. Assuming that the ring 54 has been preset to lodge in the notch 32 and that there is some tension on the trolling line 50, the plane 12 should dive in the water at an angle of approximately 30° to 45° carrying the tail line 56 and the tackle connected thereto downwardly. If the ring 54 is not preset in the notch 32 and is at any position along the arm 24, this diving angle will not be immediately achieved, but this may be accomplished by feeding out a few feet of the line 50 to permit the plane 12 to assume a diving angle such as is illustrated in FIG. 3, whereupon the ring 54 will slide on the arm 24 until the ring 54 is engaged in the notch 32. The setting of the weight 42 on the arm 26 will regulate the diving properties of the device 10. One of the unique features of this invention resides in its capability to serve as a deep diving plane when, as the speed of the troller is increased, the dive becomes deeper taking the tail line and its connected tackle downwardly therewith. This is accomplished without the use of weights as part of the terminal gear. With conventional planes using weighted terminal gear, the tail line with its weights and other tackle tends to surface as the speed of the troller is increased. Thus, the use of heavy weights in connection with the terminal gear is obviated.

Assuming that the device 10 and its component parts are in their operative positions as shown in FIG. 3 of the drawings, and assuming further that the hook 64 has been struck by a fish, tension will be applied on the tail line 56 which, by virtue of its connection with the arm extension 24b, will tend to rotate the device 10 in a counterclockwise direction, reference still being made to the last named figure.

Simultaneously, the ring 54 will begin to move downwardly on the arm extension 24a and its associated arm 24 until the ring 54 strikes against the abutment or shoulder 28. At this time the full tension applied on line 50 will be transmitted to the frame 20, including its arm 24b, and by virtue of its connection with the tail line 56, a sudden jerk is applied to the hook 64 to effect the setting of the same. This delayed tripping action of the ring 54 practically eliminates the loss of the fish by amateurs and professionals as well who are prone to prematurely jerk on the line 50 before the hook 64 has been well taken.

As a further advantage of this invention, it should be noted that the delayed tripping of the ring 54 from the notch 32 all but eliminates the undue tripping of the device until some strong force, such as a fish striking the lure or contact with another object is made, such as when the device 10 strikes the bottom. In this case, the skid 22 normally contacts the bottom and slides thereon and will, during the course of its movement, cause the device 10 to turn counterclockwise to disengage the ring 54 from its notch 32.

As has been mentioned above, the device 10 has been designed for deep water fishing for relatively large fish. Such fish may be found to run from approximately 10 to 60 pounds. This device has been found to operate satisfactorily with a minimum of lost fish because of the fact that the tail line 56 is attached in a direct line through a strong metallic frame 20 to the trolling line 50.

Having described and illustrated this invention in detail, the same is defined in the appended claims.

I claim:

1. A trolling device for submerging a fishing tail line having fish hook means connected thereto, said device comprising:
   an elongated substantially rectangular solid plane having an opposed pair of top and bottom sides, an opposed pair of leading and trailing edges and an opposed pair of side edges;
   a frame bight located forwardly of said leading edge;
   a lower arm extending rearwardly of the bight below said bottom side;
   means fixedly connecting the end of the lower arm remote from the bight to the plane;
   weight means slidably mounted on the lower arm;
   means fixedly securing the weight means in an adjusted position on the lower arm;
   an upper arm portion extending rearwardly of the bight above said top side along a prescribed axis;
   an extension of said upper arm portion extending rearwardly of said upper arm portion, upwardly a substantial distance from said axis and then arcuately downwardly towards said top side to form an arcuate notch adapted to loosely and slidably receive means for connecting the device to a trolling line;
   means fixedly connecting the end of said extension remote from said upper arm portion to the plane; and
   means enabling a tail line to be connected to said upper arm.

2. A trolling device as defined in claim 1 wherein:
said means enabling said tail line to be connected to said upper arm includes providing said plane with a transversely extending opening to threadedly receive one end of said tail line therethrough for connection with said upper arm, said one end of said tail line normally extending longitudinally of said plane in confronting relation relative to the bottom side thereof.

3. A trolling device as defined in claim 2 wherein:
said lower arm diverges from said bight portion at an obtuse angle relative thereto and said upper arm projects away therefrom at an acute angle whereby said bight portion functions as bottom engaging skid means.

4. A trolling device as defined in claim 3 wherein:
said upper arm is connected to said plane substantially at its mid-center, and said lower arm extension is connected to said plane equidistant between its said side edges and spaced inwardly from its said trailing end.

* * * * *